W. S. HARLEY.
MAGNETO CIRCUIT BREAKER.
APPLICATION FILED JUNE 29, 1917.
1,325,016.
Patented Dec. 16, 1919.
3 SHEETS—SHEET 1.
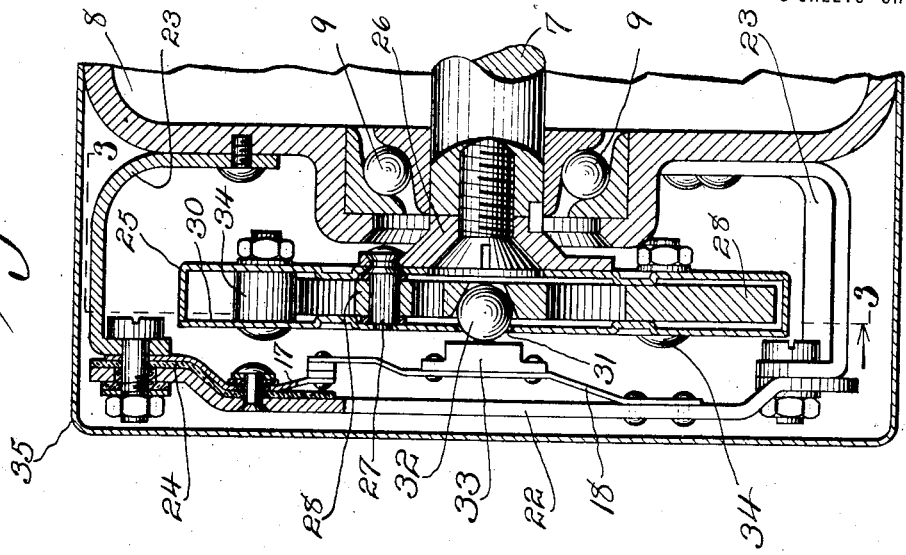
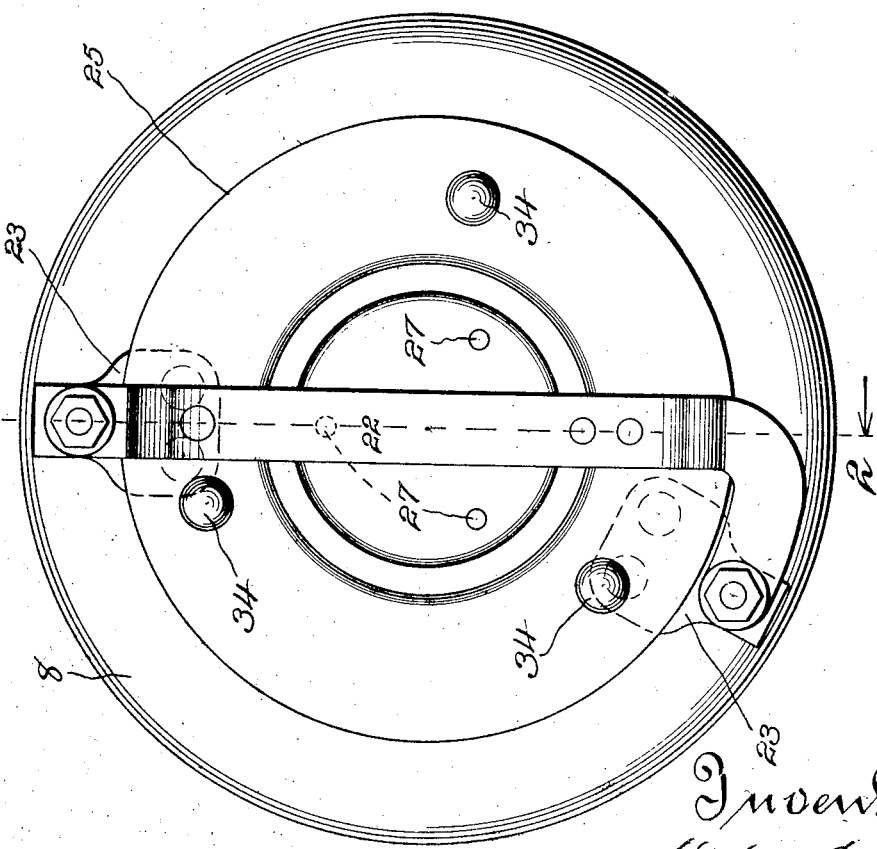

W. S. HARLEY.
MAGNETO CIRCUIT BREAKER.
APPLICATION FILED JUNE 29, 1917.
1,325,016.
Patented Dec. 16, 1919.
3 SHEETS—SHEET 2.
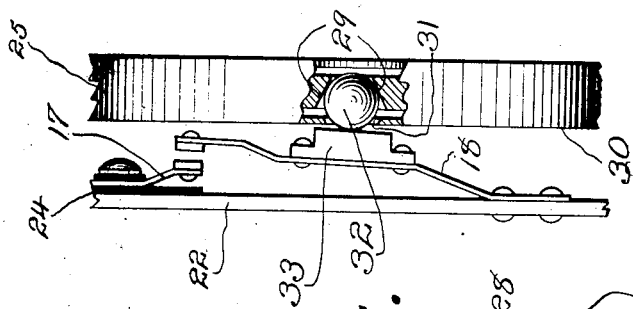
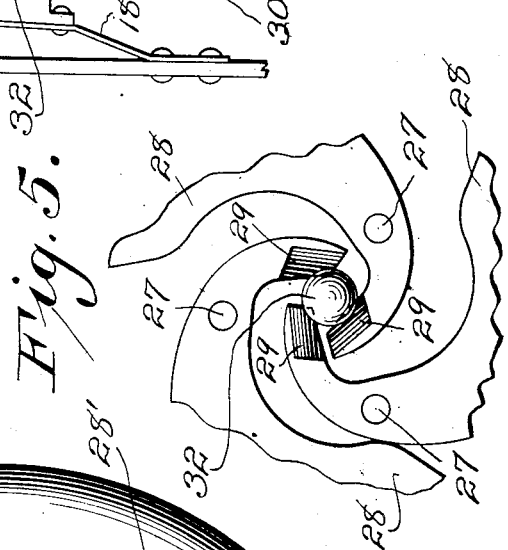
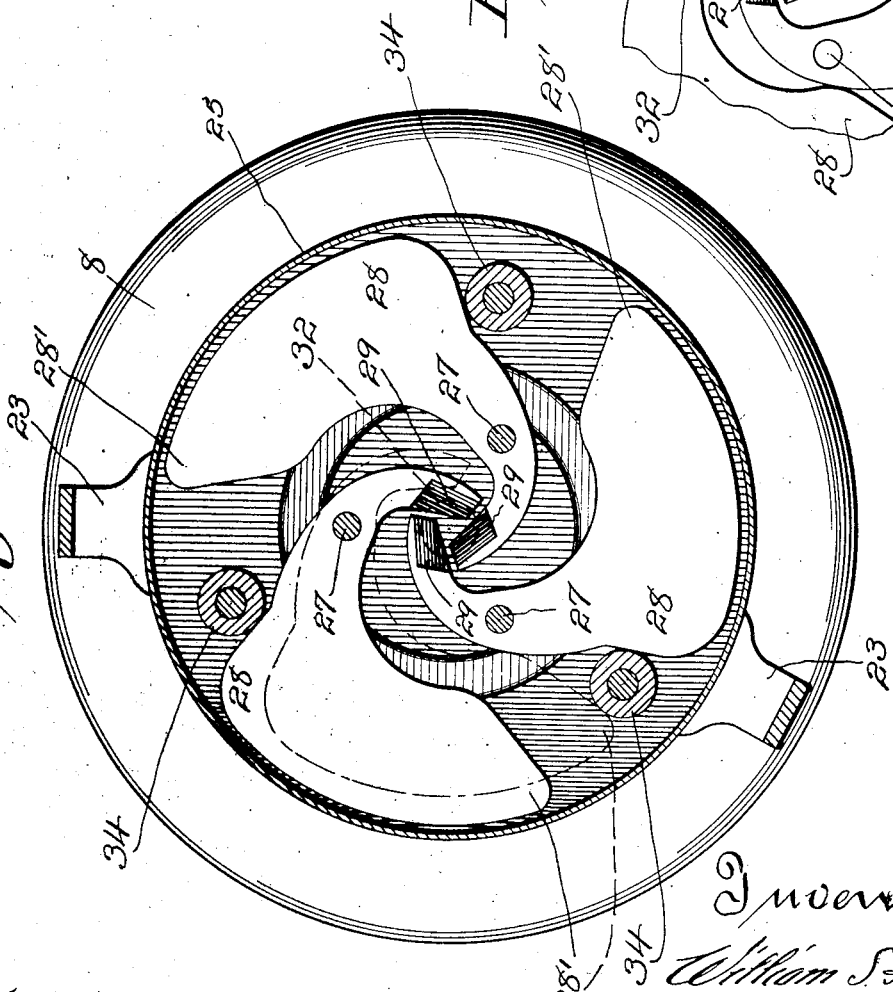

W. S. HARLEY.
MAGNETO CIRCUIT BREAKER.
APPLICATION FILED JUNE 29, 1917.

1,325,016.

Patented Dec. 16, 1919.
3 SHEETS—SHEET 3.

UNITED STATES PATENT OFFICE.

WILLIAM S. HARLEY, OF MILWAUKEE, WISCONSIN, ASSIGNOR TO HARLEY-DAVIDSON MOTOR CO., OF MILWAUKEE, WISCONSIN.

MAGNETO-CIRCUIT BREAKER.

1,325,016.    Specification of Letters Patent.    Patented Dec. 16, 1919.

Application filed June 29, 1917. Serial No. 177,700.

*To all whom it may concern:*

Be it known that I, WILLIAM S. HARLEY, a citizen of the United States, and resident of Milwaukee, in the county of Milwaukee and State of Wisconsin, have invented certain new and useful Improvements in Magneto-Circuit Breakers; and I do hereby declare that the following is a full, clear, and exact description thereof.

My invention relates to certain new and useful improvements in means for breaking the magneto circuits of wiring systems for motor-cycles or other arrangements, including a magneto driving engine and a storage battery, whereby upon stoppage of the engine, dissipation of the storage battery energy due to backflow of current through the generator is prevented.

My invention resides in the provision of a circuit breaking device which is controlled directly and positively by rotation of the armature shaft, whereby upon stoppage of the shaft the circuit connecting the magneto and storage battery is broken, and whereby upon again starting rotation of the shaft, the circuit is closed to permit proper charging action of the magneto.

It is my further object to provide a circuit breaking device of this character which is controlled by centrifugal force, and which is exceedingly simple in structure and may be readily associated with conventional designs of magnetos.

With the above and other objects in view which will appear as the description proceeds, my invention resides in the novel construction, combination and arrangement of parts substantially as hereinafter described and particularly defined by the appended claims, it being understood that such changes in the precise embodiment of the herein disclosed invention may be made as come within the scope of the claims.

In the accompanying drawings I have illustrated one complete example of the physical embodiment of my invention constructed in accordance with the best mode I have so far devised for the practical application of the principles of my invention, in which:

Figure 1 is an end plan view of a magneto equipped with my device, the dust guard or cover being dispensed with, Fig. 2 is a sectional view taken on line 2—2 of Fig. 1, only a portion of one end of the magneto casing being shown.

Fig. 3 is a transverse sectional view taken on line 3—3 of Fig. 2.

Fig. 4 is a detail view, part in section and part in elevation, of the contact arms.

Fig. 5 is a detail view of the inner ends of the centrifugal levers, the same being in the dotted line position illustrated in Fig. 3.

Figure 6:
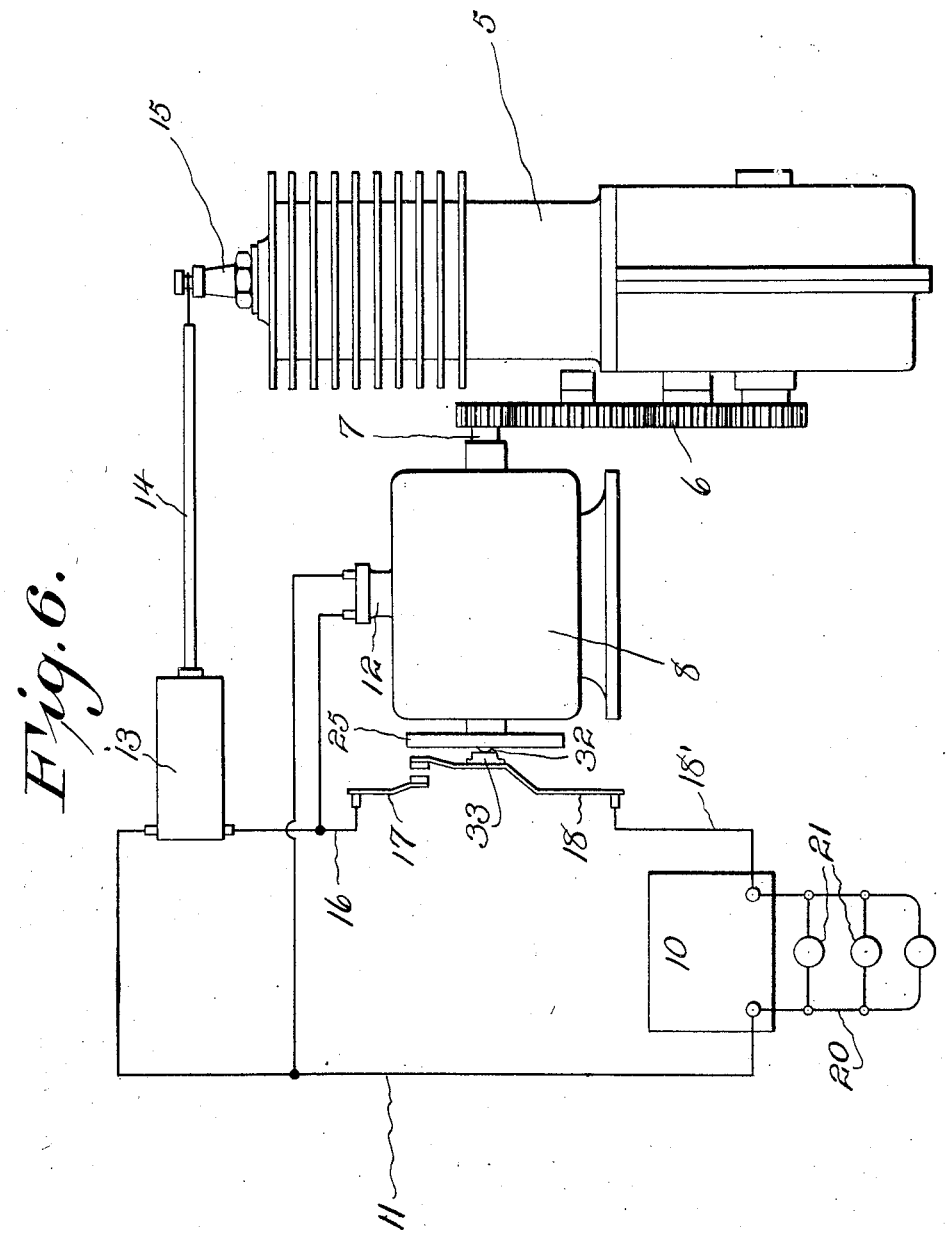
Fig. 6 is a partly diagrammatic view showing my improved breaking device associated with a motor-cycle engine and wiring system.

Referring now more particularly to the accompanying drawings, 5 designates conventionally a motor-cycle engine connected by a train of gears 6 with the armature shaft 7 of the magneto 8, the usual armature (not shown) being mounted upon the shaft 7 which is provided with a ball-bearing connection 9 in the magneto casing.

The usual storage battery 10 of the wiring system has secured to one binding post thereof a line 11 which is branched for connection with the distributer 12 of the magneto and with a spark coil 13 from which extends a wire 14 to the usual spark plug 15. From the spark coil a line 16 also extends which is branched for connection with the magneto distributer 12 and with the fixed contact arm 17 of my improved circuit breaking means, which will be later described in detail. A wire 18' connects the spring contact arm 18 of my improved device with the other binding post of the storage battery. The usual lighting circuit 20, carrying the lamps 21, is shown as connected with the storage battery.

The contact arms 17 and 18 are carried by a suitable support 22 which is secured to the magneto by means of brackets 23, the arm 17 being insulated from its support by means of any suitable non-conducting material 24, and the arm 18 being in electrical connection with its support and being normally urged from engagement with arm 17 by means of its spring action.

My improved device comprises a circular casing member 25 which is fixed to one end of the armature shaft by means of a coupling 26, and has pivoted therein at 27 three levers 28 having their outer ends weighted and their inner ends reduced and tapered in one direction as at 29.

The casing 25 is provided with a suitable cover 30 which has therein a central aperture 31 which is of a diameter smaller than that of a ball 32 disposed therein and engaged by the reduced ends of levers 28, as later described.

The spring contact arm 18 has intermediate its ends and directly opposite aperture 31, an enlargement 33 adapted to be engaged by ball 32 to force the same into contact with arm 17 to complete the circuit, as will be obvious. As will be apparent when the magneto shaft is stationary, the levers 28 will assume the position illustrated in Fig. 5 thus allowing ball 32 to move inwardly and permit the breaking of the contact between the arms 17 and 18.

It will also be obvious that upon the rotation of the armature shaft 7 and with it the casing 25, the inner ends 29 of the levers 28 will be swung inwardly by reason of the centrifugal force and in this manner the ball 32 will be forced outwardly to abut the enlargement 33 and thus complete the electrical circuit, as readily disclosed in Fig. 2.

In order to provide for a limit of movement for the centrifugal levers 28, suitable stops 34 are provided in the casing 25 which upon the rotation of the armature shaft engage the heel of the enlarged portion of these levers, and which engages the toe portion 28' of the levers when the shaft is stationary, as more clearly illustrated in Fig. 3.

From the foregoing description taken in connection with the accompanying drawings, it will be readily apparent that upon the stoppage of the armature shaft, the ball 32 will immediately move inwardly and permit the breaking of the circuit; and that upon the rotation of said armature shaft the ball will be forced outwardly and complete the circuit as will be obvious.

It will also be seen, by reference to Fig. 2 that I may, if desired, protect the entire mechanism by a suitable cover or cap 35, which will prevent the entrance of dust thereto and which will prevent the tampering therewith.

I claim:

1. A speed responsive control device including a driven shaft, a movable control member disposed adjacent one end of the shaft, and means carried by the shaft for mounting a ball in axial alinement therewith and adapted to move the ball by centrifugal action against the control member upon rotation of the shaft.

2. A speed responsive control device including a driven shaft, a movable control member in opposition to one end of the shaft, centrifugal members pivoted to the shaft and having their inner end portions beveled to roughly define a tapered recess, and a ball disposed in said recess and engaging the movable control member.

3. A speed responsive control device including a driven shaft, a movable control member, centrifugal members intermediately pivoted to the shaft end and having portions extended adjacent the axis of the shaft and beveled to roughly define a contractile and expansile tapered recess, and a ball disposed in said recess and engageable with the movable control member.

4. A speed responsive control device including a driven shaft, a casing on one end of the shaft provided with an opening in its outer wall in axial alinement with the shaft, centrifugal members pivoted in the casing and having their inner end portions beveled to roughly define a tapered recess in axial alinement with the shaft, a ball disposed in said tapered recess and projecting through the opening of the casing, and a movable control member engageable by the ball upon contraction of the recess due to centrifugal movement of said centrifugal members.

5. A speed responsive control device including a driven shaft, a switch including a movable member resiliently urged toward one end of the shaft, and means carried by the shaft for mounting a ball in axial alinement therewith and adapted to move the ball by centrifugal action against the movable switch member upon rotation of the shaft.

In testimony that I claim the foregoing I have hereunto set my hand at Milwaukee, in the county of Milwaukee and State of Wisconsin.

WILLIAM S. HARLEY.